Nov. 27, 1962 R. C. HANNEGAN 3,065,539
FLUSHING SILVER SOLDERS OVER AND ONTO SURFACES OF OTHER METALS
Filed July 24, 1959
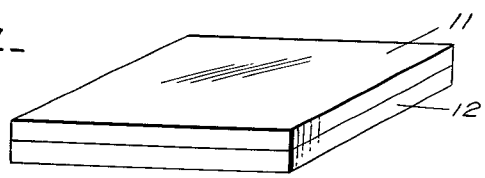
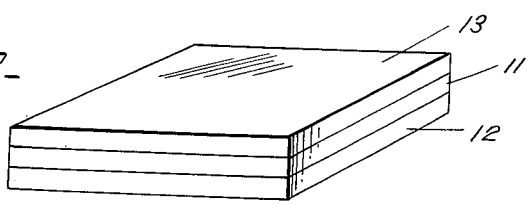
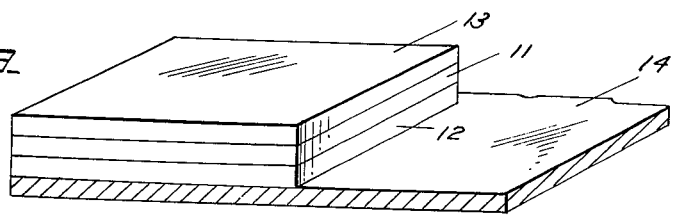
INVENTOR.
RAYMOND C. HANNEGAN
BY
ATTORNEYS

United States Patent Office 3,065,539
Patented Nov. 27, 1962

3,065,539
FLUSHING SILVER SOLDERS OVER AND ONTO SURFACES OF OTHER METALS
Raymond C. Hannegan, McKeesport, Pa., assignor to Gibson Electric Company, Delmont, Pa., a corporation of Pennsylvania
Filed July 24, 1959, Ser. No. 829,317
4 Claims. (Cl. 29—497)

The present invention relates to the art of soldering or brazing, and particularly to uniting two members by soldering or brazing the two members with the aid of a metallic alloy material having a melting point lower than the surfaces of the members being united.

Solders are usually alloys of two or more metals, whose ingredients and proportions are chosen to provide a desired melting point and wetting and/or fusion characteristic with respect to the base materials on which the solder is intended to be applied. However, it is found that many solders, and particularly silver solders, when melted and flushed over a surface to be soldered to another surface, suffer a change in composition due to vaporization of one or more of the more volatile constituents of the solder alloy. As a result, the deposited solder has a higher melting point and changed wetting characteristics. When an attempt is then made to unite the flushed surface to the other surface to be joined thereto, the deposited solder has inferior wetting properties and an inadequate bond often results.

The present invention overcomes the foregoing problem by forming a soldered or brazed joint between two surfaces by utilizing a laminated solder material comprised of two different solder alloys. One of the laminations is a solder alloy having melting and flow points lower than the other lamination. Accordingly, one of the two surfaces to be united is first flushed with the solder of the lower melting point lamination. This operation is effected without appreciably melting the higher melting point lamination, and consequently the composition and properties of the latter lamination are in no way altered. The second surface to be united is then flushed with the higher melting point solder lamination, and the soldered or brazed joint between the two metal surfaces is thus effected with an optimum bond therebetween.

As a further feature of the present invention, it is frequently desired to unite different materials, generally metallic in nature, not amenable to a good solder joint by the same solder alloy. This condition occurs, for example, in joining an electrical contact material to a conductive metallic supporting arm. The two laminations of the solder may, therefore, each be chosen of different composition particularly suitable for uniting or alloying with respective ones of the surfaces to be united, and one solder composition is further chosen to have a melting and flow point below that of the other solder composition. Then, in accordance with the foregoing teachings, the lower melting point solder is first flushed onto the appropriate one of the surfaces without appreciably melting the higher melting point solder lamination. The composition of the latter solder lamination being thus unaffected by the first flushing operation, is now available to form an optimum bond with the second of the surfaces to be united, and such operation is effected completing the soldered or brazed joint between the two metals.

One object of the present invention is to provide for soldering or brazing of two metallic surfaces utilizing two different soldering alloys.

Still another object of the present invention is to provide for soldering or brazing two surfaces utilizing two different soldering alloys, wherein the alloys have different melting and flow points so that the flushing of the lower melting point alloy onto one surface does not affect the composition and properties of the other soldering alloy.

Other objects and advantages of the present invention will be apparent to those skilled in the art from a consideration of the following detailed description of one exemplary specific embodiment of the present invention, and had in conjunction with the accompanying drawings, in which like numerals refer to like or corresponding parts, and wherein—

FIGURE 1 is an isometric fragmentary view of one form of the laminated solder employed by the present invention.

FIGURE 2 is an isometric view of one metallic surface flushed and affixed to one lamination of the solder of FIGURE 1.

FIGURE 3 is an isometric fragmentary view, partially in section, of the assembly of FIGURE 2 flushed and affixed by means of the other solder lamination to a metal base member.

The invention may be best understood by considering first an exemplary embodiment of a solder employed in the practice thereof, such as shown in FIGURE 1. This solder may be in the form of a ribbon strip comprising a first solder layer 11, and a second solder layer 12. Solder layer 11 is a relatively low melting point silver solder, while solder layer 12 is a relatively higher melting point silver solder. By way of specific example, layer 11 may have as its composition 15 per cent silver, 80 percent copper and 5 percent phosphorous. This alloy has a melting point of 1185° F. and a flow point of 1300° F. Layer 12 may have as its composition 9 percent silver, 51 percent copper and 40 percent zinc. This latter alloy has a melting point of 1510° F. and a flow point of 1600° F. When solder layer 11 is heated up to its melting point and used to flush a metal surface, the phosphorous vaporizes and the composition and its wetting properties are altered, as well as its melting point being raised, as the composition approaches a silver-copper alloy. Meanwhile, solder layer 12, which is not melted during flushing, retains its original characteristics, and can have a lower melting and flow point than the modified solder layer 11.

In a specific application, the member surface 13 would represent an electrical contact material such as a pressed and sintered refractory powder infiltrated with silver. The member 14 would be a copper or other electrically conductive supporting arm to which the contact is to be secured. Through the use of the laminated solder, as herein set forth, it is possible to use most suitable solder compositions for securing each of the elements.

Thus, in accordance with the present invention, as shown in FIGURE 2, a strip or piece of the composite solder is first affixed to a first metal surface 13 by melting only layer 11, the lower melting point solder, in contact with metal surface 13 and flushing this layer onto said metal surface, without bringing the solder layer 12 to its melting point, or at least without significantly melting layer 12. In this manner, a good solder bond is obtained between solder layer 11 and metal surface 13, and although in this process the composition of layer 11 is so modified as to render it ineffective for a further soldering operation, layer 12 remains unaffected. Thus, a further soldering operation is then effected by flushing solder layer 12 at a higher temperature onto the metal surface 14, as shown in FIGURE 3. In this manner, a good and effective solder bond between metal surfaces 13 and 14 is obtained.

If surface 13 is a different material than surface 14, the present invention enables the use of two solders each specifically designed for the material to which it is intended to be bonded. At the same time, by selecting these solders to have different melting points, and by flushing the lower melting point layer onto its intended surface first without appreciably melting the higher melting point solder layer, the latter layer may thereafter be flushed onto the other surface, without having suffered any significant change in composition as a result of the first flushing operation of the lower melting point solder layer.

The laminated silver solder strip of FIGURE 1 can be fabricated in several ways, as will be apparent to those skilled in the art. For example, the lower melting point solder, while in a molten condition, can be sprayed onto a preformed ribbon of the higher melting point solder. Alternatively, the lower melting point solder can be simply melted onto a formed ribbon of the higher melting point solder.

Although one specific example of a suitable laminated solder has been given by way of illustration, the present invention is obviously not limited to the stated composition, or even to the particular types of solders there illustrated. Basically, as previously expressed, the present invention resides in the procedure of utilizing a laminated solder, wherein one lamination has melting and flow points below those of the other lamination, and wherein one metallic surface is first flushed with the lower melting point solder without appreciably melting the higher melting point solder, and thereafter a second metallic surface is flushed with the higher melting point solder. In this manner each of the two soldering steps is effected with a solder alloy whose composition is appropriately established to provide a good solder bond with its respective metallic surface, and particularly, the solder used in the second soldering step has not been significantly altered in composition as a result of the first soldering step.

Also, it is understood that the invention is not limited to the ribbon form of solder illustrated and described, nor to any other illustrative details described, since numerous modifications and variations thereof will be apparent to those skilled in the art, and such as are within the spirit and scope of the appended claims are contemplated as embraced by the present invention.

I claim:

1. A method of soldering an electrical contact to a conductive metallic supporting arm with a laminated solder having a first lamination of a silver-copper-phosphorous alloy and a second lamination of a silver-copper-zinc alloy bonded to the first lamination, said second lamination having a melting point and flow point, respectively, in excess of the melting point and flow point, respectively, of said first lamination, comprising bonding said first lamination to the contact surface by flushing said first lamination on to said surface with a quantity of heat sufficient to cause said first lamination to flow and modify its characteristics so as to render it ineffective for a further solder operation but insufficient to appreciably melt said second lamination and, thereafter, bonding said second lamination to a surface of the metallic supporting arm by heating said second lamination above its flow point in contact with the last mentioned surface and flushing said second lamination over said last mentioned surface.

2. A method of soldering an electrical contact to a conductive metallic supporting arm with a laminated solder having a first lamination consisting essentially of 15% silver, 80% copper and 5% phosphorous and a second lamination bonded to said first lamination and consisting essentially of 9% silver, 51% copper and 40% zinc, comprising bonding said first lamination to the contact surface by flushing said first lamination on to said surface with a quantity of heat sufficient to cause said first lamination to flow and modify its characteristics so as to render it ineffective for a further solder operation but insufficient to appreciably melt said second lamination and, thereafter, bonding said second lamination to a surface of the metallic supporting arm by heating said second lamination above its flow point in contact with the last mentioned surface and flushing said second lamination over said last mentioned surface.

3. A method of soldering an electrical contact comprising a pressed and sintered refractory powder infiltrated with silver to an electrically conductive metallic supporting arm with a laminated solder having a first lamination of a silver-copper-phosphorous alloy providing a bond between the solder and the contact surface and a second lamination of a silver-copper-zinc alloy bonded to the first lamination and providing a bond between the solder and the supporting arm, said second lamination having a melting point and flow point in excess of the melting point and flow point, respectively, of said first lamination, comprising the steps of bonding said first lamination onto said contact surface by flushing said first lamination onto said surface with a quantity of heat sufficient to cause said first lamination to flow and modify its characteristics by decreasing its phosphorous content so as to render it ineffective for a further soldering operation, but insufficient to appreciably melt said second lamination, and thereafter bonding said second lamination to a surface of the metallic supporting arm by heating said second lamination above its flow point in contact with the last mentioned surface and flushing said second lamination over said last mentioned surface.

4. A laminated solder composition having a first lamination consisting essentially of about 15 percent silver, 80 percent copper and 5 percent phosphorous, and a second lamination consisting essentially of about 9 percent silver, 51 percent copper, and 40 percent zinc.

References Cited in the file of this patent

UNITED STATES PATENTS

| | | |
|---|---|---|
| 2,190,267 | Light | Feb. 13, 1940 |
| 2,301,915 | Harrington | Nov. 17, 1942 |
| 2,354,409 | Strasser | July 25, 1944 |
| 2,362,983 | Durst | Nov. 14, 1944 |
| 2,425,053 | Swinehart | Aug. 5, 1947 |
| 2,473,712 | Kinney | June 21, 1949 |
| 2,568,242 | Matteson | Sept. 18, 1951 |